Jan. 5, 1960    E. A. HANYSZ ET AL    2,920,269
COATING THICKNESS GAGE
Filed Aug. 29, 1957    2 Sheets-Sheet 1
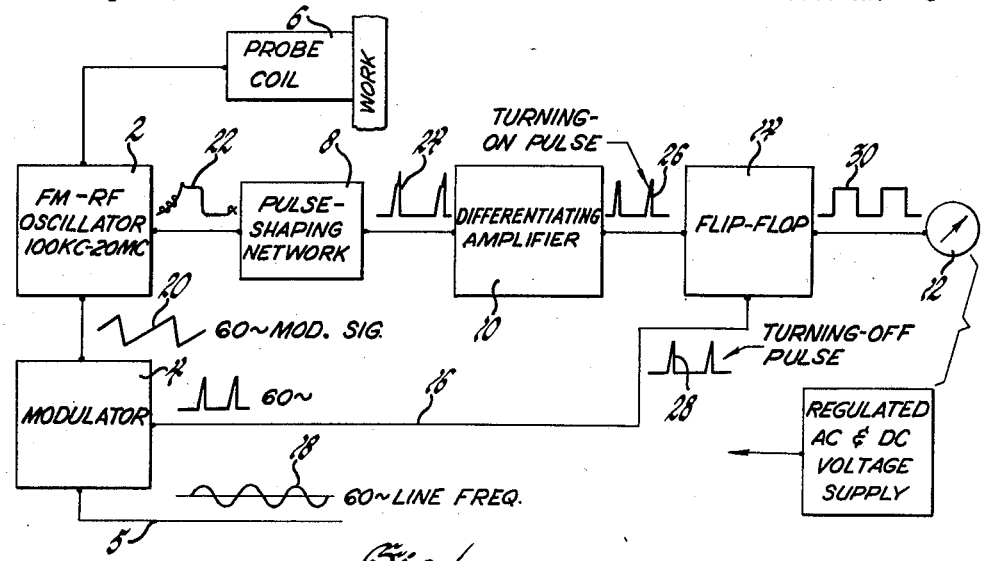
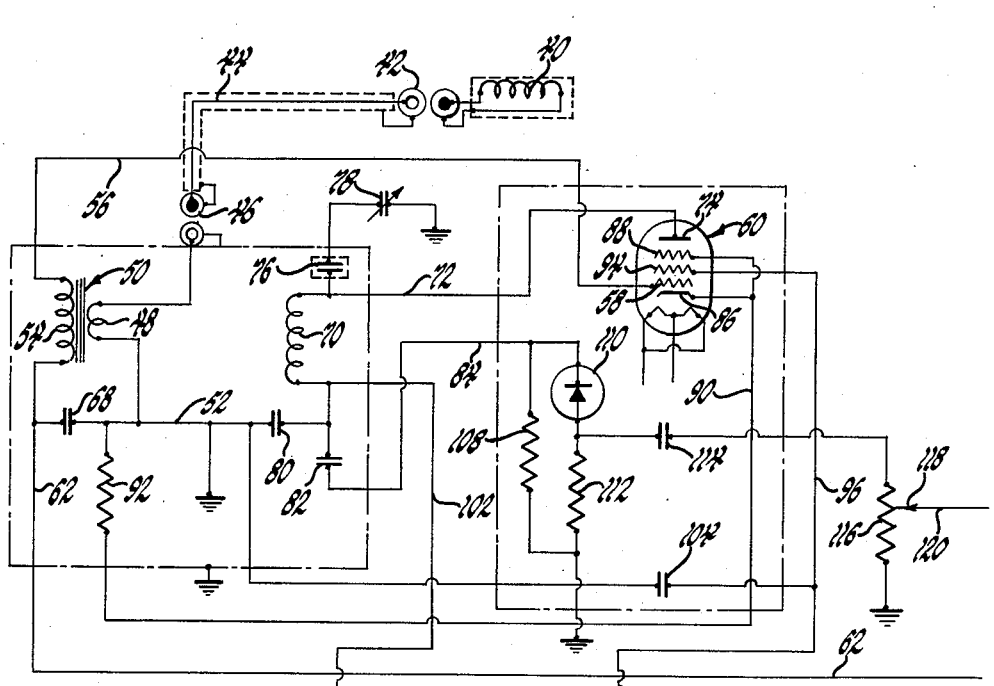
INVENTORS.
Eugene A. Hanysz,
BY Clark E. Quinn, &
Edward F. Weller, Jr.
R. E. Fowler
ATTORNEY.

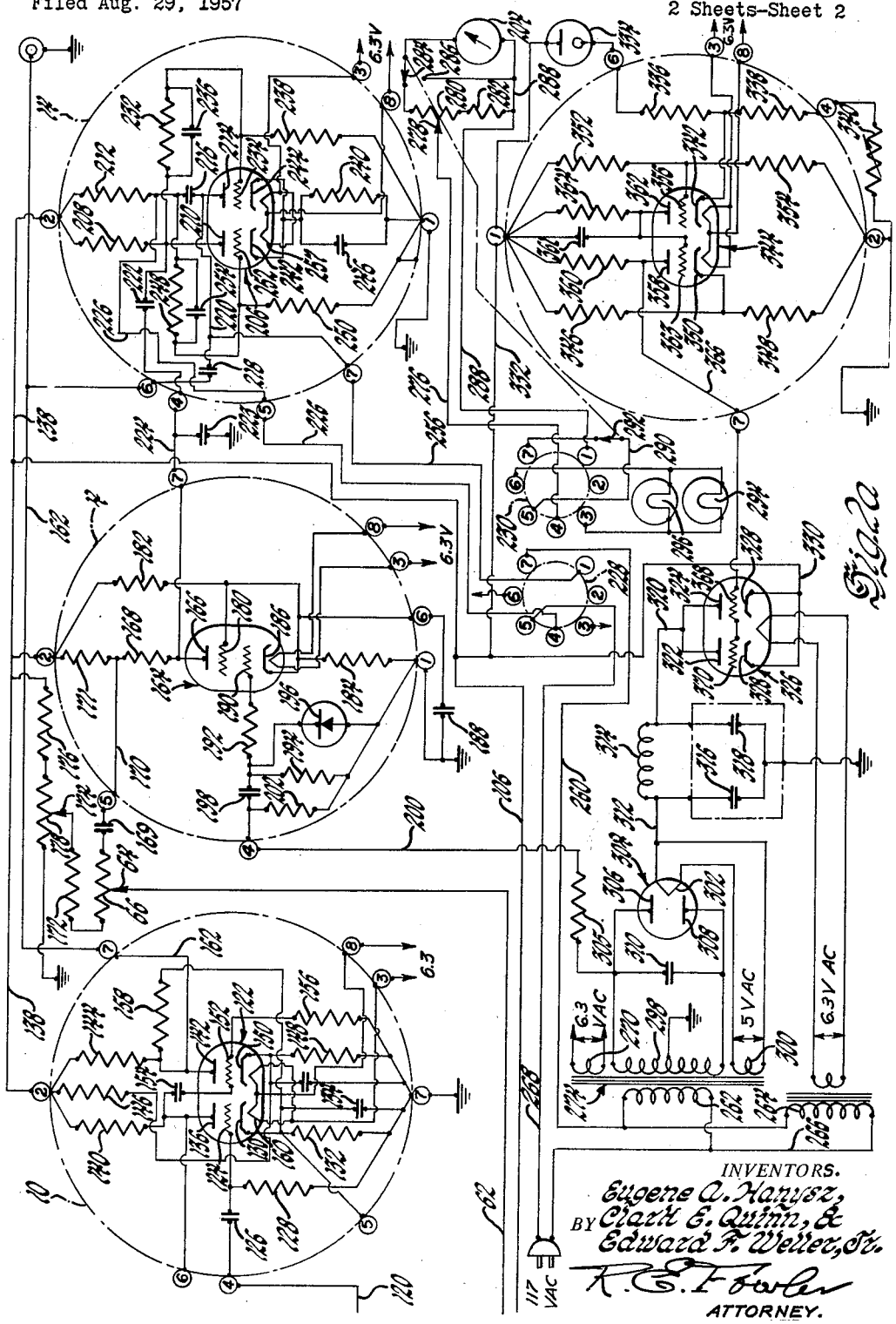

United States Patent Office 2,920,269
Patented Jan. 5, 1960

---

2,920,269

COATING THICKNESS GAGE

Eugene A. Hanysz and Clark E. Quinn, Royal Oak, and Edward F. Weller, Jr., Detroit, Mich., assignors to General Motors Corporation, Detroit, Mich., a corporation of Delaware Application August 29, 1957, Serial No. 681,082

6 Claims. (Cl. 324—34)

This invention relates to measuring means and more specifically to non-destructive testing means for measuring the thickness of coatings or platings of one material on another or laminations in composite materials.

It is desirable and often necessary to obtain the measurement of the thickness of a coating of paint or a plated metal area to determine whether the thickness of the material meets the specifications set up therefor. The measuring means of this invention utilizes high frequency waves and operates on the basis of varying the loading of a high frequency oscillator. A similar form of coating thickness or laminar thickness gage is described in application Serial No. 569,063 filed March 2, 1956, in the names of Eugene A. Hanysz and Roger L. Saur, assigned to a common assignee, entitled "Thickness Coating Gage." The present invention is an improvement over the earlier filed case.

It is therefore an object in making this invention to provide means to gage or measure the thickness of a coating or of a lamina of a composite part.

It is a still further object in making this invention to provide non-destructive testing means for measuring the thickness of a coating or lamination or to locate a crack or occlusion in a part.

It is a still further object in making this invention to provide means for measuring the thickness of a thin layer of one material on a base or defect in a part by utilizing the change in loading on an oscillator-driven inductance coil.

It is a still further object in making this invention to provide means for measuring the thickness of a layer of material on a base utilizing a tunable high frequency oscillator to which a variable load is applied and an indicating means provided to indicate the oscillator output for proportionate measuring purposes.

With these and other objects in view, it will be apparent as the specification proceeds that our invention will be best understood by reference to the following specification and claims and the illustrations in the accompanying drawings in which:

Figure 1 is a block diagram of a measuring system embodying our invention.

Figures 2 and 2-A form a composite circuit diagram of our high frequency non-destructive testing system.

Our measuring and testing system is premised on two basic facts: first that alternating current penetrates into a conductor over which it flows to a distance which depends upon the frequency of said current. This is called the "skin effect." The higher the frequency the nearer to the surface the current flows and the less penetration is obtained. The second fact upon which our invention rests is that the high frequency oscillator may be thrown out of oscillation or blocked by increasing the load to a critical point. In the current design these facts are utilized as follows.

A sweep oscillator is provided, and to it there is connected an inductance load coil. This coil is adapted to be brought into juxtaposition with the work which may be coated or laminated. As the frequency of the oscillator scans a predetermined band, the inductance coil will induce a field into the work producing eddy currents which will penetrate to different levels dependent upon the frequency and which will create a counter flux when the part being measured or examined is laminar or coated, and the current penetrates to a laminar boundary or to the thickness of the coating, a decided change in the loading occurs. This in turn provides a considerable change in the resistance as well as the inductance of the coil, and such an added loading of the oscillator that it is cut off or blocked. Thus through the proper selection of frequencies for the particular material and dimensions of parts under study, the measuring means may be designed to provide a sweep over a given band of frequency and produce an indicating pulse at a given frequency, proportionate to the thickness of the coating or lamination and therefore provide a measurement of the same as the current penetration at that frequency may be calculated and also to give an indication of a flaw by loading change.

As will be evident from the above discussion, the invention utilizes a change in oscillator plate current or flow when it changes from an oscillatory to a non-oscillatory state to provide an indicating measurement. This change in plate current is pulse-shaped, amplified and then applied to an indicating means. This type of system is shown in block diagram in Figure 1. In that figure there is an oscillator 2 which is indicated as being a frequency modulated oscillator having any desired range, for example, from 100 kilocycles to 20 megacycles. This adapts the measuring means to a large number of materials and a wide variety of measurements in dimension.

The oscillator 2 has inductively coupled into its grid circuit a probe coil 6 which is adapted to be brought into contact with a work piece or test part whose lamination thickness or plating thickness it is desired to measure. The oscillator is tuned over the desired portion of the frequency spectrum which it may be currently using for its measurement, by the modulator 4 connected between the conventional power line 5 and the oscillator 2. The pulse obtained by the changing of the plate current of the oscillator 2 is applied to a pulse shaping network 8. The output of the pulse shaping network 8 is applied in turn to a differentiating amplifier and further pulse shaping section 10 where it may be amplified to any desired degree. This differentiating amplifier section 10 provides a triggering pulse for the indicating means. The indicating means in this instance is in the form of a microammeter 12 which is turned on by the pulse from the differentiating amplifier and remains on measuring the average value of current pulses received until it is turned off. Since the repetition rate of the pulses is fixed, the average current will vary with pulse width. The switching on and off of the indicating meter 12 is accomplished through a flip-flop or Eccles-Jordan trigger circuit 14. As previously mentioned, the pulse for actuating the flip-flop circuit 14 to turn on the microammeter 12 is provided by the amplifier 10. The pulse to turn the microammeter off is applied from the modulator 4 through the line 16 to the flip-flop circuit to cause it to reverse its tube conduction and cut the meter off as will be described later in detail.

We have also indicated in Figure 1 at the various locations where applicable, the form of wave shape which is obtained in that portion of the circuit. For example, on line 5 there is produced the usual sine wave alternating 60 cycle current as illustrated at 18, and the modulator section 4 changes this into a sawtoothed wave form 20 which is applied to the oscillator to cause the oscillator to scan or sweep over a predetermined frequency band during one modulating cycle of operation. The pulse obtained from the blocking of the oscillator and the change in plate current in the oscillator is shown by the wave 22 on that portion of the circuit between the oscillator 2 and the pulse shaping network 8. The pulse shaping network 8 changes the pulses 22 into short pips 24 and these are amplified and further shaped and appear as similar pips 26 whose size is shown no larger in order to conserve space. These actuating or turning-on pips 26 are applied to a double triode flip-flop circuit causing one section to conduct, thus applying power to the meter. It then remains conducting until a turning-off pulse 28 on line 16 is applied at a later time incident to cut off this triode section and reverse the conductivity. The time period between the turn-on and turn-off pulse produces a square wave control current 30 which is applied to the meter 12. The length of time between the turning-on and turning-off pulses is controlled by the point in the scanning frequency spectrum at which the oscillator blocks as compared with the pulse from the modulator causing return to the opposite end of the frequency spectrum. The meter therefore reads a summation of the time it is turned on which is proportionate to the thickness of the lamination which it is desired to obtain.

Having described the components of our measuring means in general, reference is now made to composite Figures 2 and 2-A. Figure 2 includes the oscillator and probe section of the previously described circuit. The probe coil 40 is shown at the upper portion of the figure and this coil 40 is connected through disconnect plug 42 to transmission line 44, and thence through a second disconnect plug 46 to the oscillator input per se by having one terminal connected to winding 48 of coupling transformer 50. The other terminal of winding 48 is connected through line 52 to ground. Secondary winding 54 of transformer 50 has one terminal connected through line 56 to the control grid 58 of the multi-element oscillator tube 60. The other terminal of winding 54 is connected to line 62 which extends to an adjustable tap 64 movable over a resistance 66 for the purpose of applying the modulating sawtooth wave to the oscillator input and adjusting the amplitude of the same. A bypass condenser 68 is connected between line 62 and ground. A plate inductance winding 70 having no coupling with winding 54 has one terminal connected through line 72 to the plate 74 of the oscillator tube 60. The line 72 is connected to ground through tuning condenser 78 which may be set to determine the frequency band over which the oscillator tunes. Optionally, a further condenser 76, shown in dotted lines, may be included in this connection if necessary to change the frequency range of the oscillator. The other terminal of the winding 70 is connected through a bypass condenser 80 to ground, and also through a coupling condenser 82 to the pulse shaping section which was previously shown as 8 in the block diagram through line 84. The cathode 86 and the suppressor grid 88 of the oscillator tube 60 are commonly connected through line 90 to one end of biasing resistor 92, the other end of which is grounded. Screen grid 94 of tube 60 is connected through line 96 to one terminal of two resistors 98 and 100, connected in series, the remote terminal of which is connected to the lower terminal of the winding 70 through line 102. Bypass condenser 104 is connected between line 96 and ground. A point intermediate resistors 98 and 100 is connected through line 106 to the B+ supply line, to be later described.

The pulse shaping section, to which the pulse developed by the blocking of the oscillator is applied, consists of a resistor 108 connected between line 84 and ground and a parallel circuit around said resistor 108 which consists of a diode rectifier 110 which is connected in series with a resistor 112. These two elements are serially connected in shunt to resistance 108 between line 84 and ground. When the pulse such as 22 is applied to this section, its shape is changed to a sharp peak or pip such as shown at 24 on Figure 1 which is developed across resistance 112. This shaped pulse is connected through coupling condenser 114 connected intermediate diode 110 and resistance 112 and thence through resistor 116 to ground. A variable tap 118 movable over resistance 116 takes off a proportionate part of the signal and this tap is connected through line 120 to the differentiating amplifier section 10. This amplifier section includes a double triode tube 122 and line 120 is connected directly to the control grid 124 of the first triode section through coupling condenser 126. A grid resistor 128 is connected between grid 124 and ground. Cathode 130 of the first triode section is likewise connected to ground through biasing resistor 132 to provide the proper cathode bias.

A bypass condenser 134 is connected between cathode 130 and ground. Plate 136 of the first triode section of tube 122 is connected to high voltage power line 138 through load resistor 140. In like manner, plate 142 of the second triode section is connected through a similar load resistor 144 to power supply line 138. A voltage divider consisting of two resistors 146 and 148 in series is connected between the power line 138 and ground. Cathode 150 is connected to a point between resistors 146 and 148 and is provided with the proper bias thereby. Control grid 152 of the second section of the tube 122 is connected directly to plate 136 of the first section through coupling condenser 154, and also connected through resistor 156 to ground. A resistor 158 is connected between plate 142 and cathode 130 to maintain proper feed bulk. The filaments 160 for the tube 122 are indicated as being connected to the 6.3 v. winding on the power transformer later to be described. The actual connections to the filaments are omitted in order to simplify the disclosure. Plate 142 of the second amplifier section is directly connected through line 162 to the flip-flop section 14 which controls the flow of measured current to the indicating meter. It is upon this line that the turn-on pulse is generated which causes the flip-flop section 14 to be so controlled as to pass current to the meter. Thus, the shaped pulse appearing on line 120 is amplified through the differentiating amplifier 10 and applied to the conducting line 162.

The next section to the right on Figure 2a is the modulator section 4. This section produces two signals, one, the sawtooth modulating signal for tuning the oscillator section 2 over the prescribed band and the second, the turn-off signal which is applied to the flip-flop circuit 14. This modulator section includes a tetrode tube 164, the plate 166 of which is connected through two resistances 168 and 171 in series to the power supply line 138. Line 170 is connected from a point intermedaite the resistances 168 and 171 to coupling condenser 169 and then to one terminal of a resistor 66 which is connected in series with a second resistor 172 and thence to a movable tap 174 which may be moved over the surface of a potentiometer consisting of two resistances 176 and 178 connected between the power line 138 and ground. This provides an adjustable D.C. bias to compensate for differences in oscillator tubes. The movable tap 64 is connected to line 62 and applies the modulating sawtooth wave to the input of the oscillator to tune the same over the desired frequency band of operation. A bias voltage divider for the tube 164 consists of two resistances 182 and 184 which are connected in series between the power line 138 and ground. The grid 180 is connected to a point intermediate the resistances 182 and 184 to give the grid the proper bias. The cathode 186 is also connected to the same point and has the same bias applied thereto. The cathode is also connected through a bypass condenser 188 to ground. The control grid 190 of tube 164 has a resistor 192 connected directly thereto. The opposite terminal of the resistor 192 is connected through resistor 194 to ground, through diode 196 to ground and through a coupling condenser 198 to power supply line 200. An additional resistor 202 is connected between line 200 and ground.

The control section for the indicating meter 204 consists of the flip-flop circuit identified generally by the reference character 14. This flip-flop circuit includes a duo-triode tube 206 which, when the proper section of this tube becomes conductive, applies power to the indicating meter 204 in a manner to be described, and when the second section becomes conductive, cuts off power for the meter and it therefore reads the summation of the conductive time for this portion of the tube. The connections for the flip-flop circuit includes a load resistor 208 which is connected between power supply line 138 and plate 210 of the first section of the tube 206 and a similar load resistance 212 connecting power line 138 to plate 214 of the second section. A coupling condenser 216 is interposed in the connection between resistance 212 and plate 214. The turn-on pulse applied to line 162 is connected through a coupling condenser 218 and line 220 to the plate 214 of the second section. Plate 210 of the first section is connected through coupling condenser 222 to line 224 which extends to the output of the modulating tube 164 upon which the turn-off pulse is developed. A condenser 223 is connected from line 224 to ground to determine the frequency of the sawtooth modulating wave. A point intermediate resistance 212 and condenser 216 is connected through line 226 to pin No. 4 of the disconnect plug half 228 which mates with the second half 230 to make necessary connections between portions of the apparatus. The resistor 232 is connected between plate 210 of the first triode section of the tube 206 and the control grid 234 of the second section. This resistor is bypassed by a condenser 236. In effect, resistance 208 forms in combination with resistance 232 and resistance 238, a voltage dividing circuit between the power supply line 138 and ground. Thus, the voltage across resistance 238 provides the desired bias on grid 234. A further biasing resistor 240 is commonly connected to the cathodes 242 and 244 and to ground. A bypass condenser 246 is connected across resistor 240.

In a similar manner, resistance 212 is connected in series with a resistance 248 and a third resistance 250, forming a potential divider across the power supply line 138 and ground. A point intermediate resistance 212 and resistance 248 provides the potential to the plate 214 and an intermediate point between resistances 248 and 250 is connected to the control grid 252 of the first triode section and provides a bias therefor. Bypass condenser 254 is connected in shunt to resistor 248. The filaments 257 for the tube 206 are shown to one side and are adapted to be connected to a suitable 6.3 v. power source as shown by the arrows. All of the pins of the disconnect plug are not utilized in the current instance. However, as mentioned, pin 4 of the plug half 228 is connected to line 226. Pin No. 1 of the half member 228 is connected through line 256 to line 220 which extends to the plate 214. Pin No. 7 of the plug half 228 is connected through line 260 to one terminal of each of the two primary power transformer coils 262 and 264. The opposite terminal of each of these primary windings is connected through line 266 with one prong of a plug in connector for a conventional power source. The other supply line 268 extending to the plug is connected to pin No. 5 thus applying 60 cycle current across pins 1 and 5. Pins 3 and 6 are connected to the output of the secondary winding 270 of the power transformer 274 and have therefore 6.3 v. supplied thereto. The matching numbered receptacles for the pins in the second plug half 230 are connected as follows: matching pin No. 4 is connected through line 276 to a variably positioned tap 278 which is movable over resistor 280, connected in series with a second resistor 282 across the indicating meter 204. One terminal of the resistor 280 is connected through switch 284 to one side of the meter and the remaining lead on resistor 282 is connected directly through line 288 to the other side of the meter. Switch 284 has two positions and when moved to disconnect the resistances from the meter, closes with stationary contact 286 to directly shunt the meter. Line 288 which extends from one side of the meter to the last mentioned lead of resistance 282 extends also to pin 1 of the disconnect plug half 230. Pin 5 on disconnect plug half 230 is connected through line 290 and switch 292 to pin 7 on the same plug half. When switch 292 is open, these two pins are unconnected but when closed, they are connected together. Switches 284 and 292 are mechanically ganged together to be simultaneously actuated. In this manner, the output of the flip-flop circuit is connected to the indicating meter 204 and the amplitude of the pulses applied to the meter are adjusted by movement of the tap 278. Two indicating lamps 294 and 296 are connected in parallel across the pins Nos. 3 and 6 of the disconnect half 230.

The power supply for the system is provided from the constant voltage power transformer 274 which is supplied with ordinary 60 cycle 117 volt A.C. current. This power transformer 274 has two primary windings 262 and 264. Associated with primary winding 262 there are three secondary windings, 270 which provide 6.3 volts for the filament circuits of the tubes which has been described, a secondary winding 298 providing the main high voltage power for the system and a third secondary winding 300 which provides a 5 volt A.C. power supply for the filament 302 of the full wave rectifier tube 304. The secondary 298 has its center tap grounded and one terminal directly connected to anode 306 of the rectifier 304 and its other terminal in like manner connected to anode 308 of the full wave rectifier. Anode 306 is also connected through resistor 305 to line 200. The voltage divider 202 and 305 provides the voltage for triggering the sawtooth wave at the A.C. supply frequency. A tuning condenser 310 is connected directly across the secondary winding 298. The output of the full wave rectifier is connected through line 312 to a filter section consisting of a series inductance 314 and a pair of condensers 316 and 318 connected from each end of the inductance 314 to ground. The filter section is connected directly through line 320 to the plates 322 and 324 of a duo-triode tube 326 which acts as a series regulator. The cathodes 328 of the tube 326 are commonly connected through line 330 to line 106 which extends directly to plate power supply line 138. Line 330 is also connected through tieline 332 to a voltage regulating section and to regulating tube 334 which is connected in series with a potential divider formed of series resistances 336, 338 and rheostat 340 to ground. The voltage divider thus formed has a point intermediate resistances 336 and 338 which is connected to cathode 342 of the second section of the duo-triode tube 344 to provide cathode biasing therefor. A second potential divider formed of two resistances 346 and 348 are connected in series between line 332 and ground. A point intermediate these two resistances is connected to cathode 350 of the first triode section and provides cathode bias therefor. A third potential divider formed of two resistances 352 and 354 is connected between power line 332 and ground and a point intermediate these two resistances is connected to grid 356 and provides a bias therefor. Plate 358 of the first triode section of tube 344 is connected through load resistor 360 to power supply line 332 and in like manner, plate 362 of the second triode section is connected through resistor 364 to power supply line 332. A condenser 361 is connected between line 332 and plate 362 which is connected also to grid 363 of the first section. Plate 358 of the first section of the regulator amplifier tube is connected through line 366 to both grids 368 and 370 of the series regulator tube 326 to thus regulate the voltage on line 330. In the operation of the device, the plug is connected into a receptacle causing the power supply to be actuated and provide the proper voltages on various parts of the system. At the same time the switches 284 and 292 are moved simultaneously to the positions shown in the drawings. At this time, let it be assumed that the adjustable taps 118, 64 and 278 have been previously moved to the correct positions for testing the range of thicknesses and the materials which it is desired to inspect. At this time the 60 cycle power supply is providing a sawtooth wave in the output circuit of the modulator stage 4 which sawtooth wave is applied through line 170, condenser 169, resistance 66, tap 64 and line 62 to the tuning coil 54 in the input circuit of the oscillator tube 60. The adjustable condenser 78 has also previously been set to provide the suitable range of frequencies produced by the oscillator which it is desired to include in the scanning. The grid circuit of the oscillator tube and the plate circuit are separately tuned to about the same frequency in this range and then backed off from that frequency until the oscillator is on the verge of falling out, or blocking. The probing coil 40 is then moved into juxtaposition to the plated or laminated body and assuming that the current penetration equal to the thickness of plate is reached by the induced eddy currents within the scanning range of frequencies as the band is traversed, the oscillator will first oscillate from an initiating frequency to a frequency at which the loading induced by the increased inductance and resistance of the probe when current penetration equals lamina thickness is sufficient to block the oscillator and the oscillator ceases oscillating. From that frequency to the end of the scanning range the oscillator remains blocked or off but is started again as the oscillator is switched to the other end of the frequency range to again scan the spectrum. Thus, once for each scanning operation, the oscillator will block. This blocking changes the plate current and causes a negative pulse to be obtained in the oscillator output. This oscillator pulse is used eventually for energizing an indicating meter 12. However, at the output of the oscillator, the wave is not of the correct shape and so is put through a pulse shaping section consisting of condenser 82, resistor 108, diode 110 and resistance 112.

The operating pulse thus obtained is then further pulse-shaped and amplified by applying it to a differentiating amplifier 10 through line 120 where it passes through two stages of amplification and is then applied to line 162. This actuating or so-called "turning on" pulse is applied to plate 214 of the second triode section of tube 206 causing that section of the tube to conduct, and applying voltage across the potentiometer consisting of resistors 280 and 282. Meter 204 will then read the average value of current flowing through this second triode section and this current will continue to flow until a turning-off pulse is introduced to plate 210 of the first triode section from the output of the modulator stage 4 which will cause the first triode section to become conductive, which turns off the second triode section. When the second triode section becomes non-conductive, the meter 204 drops down to zero but its average reading is dependent upon the length of time it was energized since the frequency of operation is 60 cycles per second. Thus, each time the sawtooth wave causes the oscillator to sweep over its adjusted band of frequencies, the oscillator will block at some particular frequency indicative of the current penetration reaching a boundary and load and the meter 204 will be energized and at some later point cut off. The width of these control pulses is proportional to the current penetration and/or blocking frequencies and also determines the average reading of the meter 204 which can be calibrated in thickness of coating or lamination.

The probe, when moved past a part in which a crack exists, also experience a change in load due to a change in inductance and resistance and this too will produce a blocking action of the oscillator and cause a turning-on pulse to be produced and an indication will appear on the meter. In this case however the blocking will indicate a physical location of the probe rather than a dimension of a part.

We claim:

1. In testing apparatus an oscillator having a tunable input and a tunable output circuit, reactance probing means adapted to be moved into juxtaposition with a part to be tested which is electrically connected to one of the tunable oscillator circuits to change the load on the oscillator, means connected to the oscillator to cause it to scan repetitively over a predetermined frequency spectrum, said loading of said reactance probing means when placed in proximity to a part being tested being of such value as to cause blocking of said oscillator at some frequency within the range, pulse-shaping means connected to the output of the oscillator to shape the pulse provided in said output circuit when said oscillator ceases to oscillate, indicating means connected to said pulse-shaping means and energized by said pulse and a pulse actuated switching means connected between the pulse-shaping means and the indicating means and to the means connected to the oscillator to cause it to scan to cut off the indicating means at the end of each scanning cycle to provide an indication of dimension.

2. In testing apparatus an oscillator having a tunable input and a tunable output circuit, reactance probing means adapted to be moved into juxtaposition with a part to be tested which is electrically connected to one of the tunable oscillator circuits to change the load on the oscillator, means connected to the oscillator to cause it to scan repetitively over a predetermined frequency spectrum, said loading of said reactance probing means when placed in proximity to a part being tested being of such value as to cause blocking of said oscillator at some frequency within the range, pulse-shaping means connected to the output of the oscillator to shape the pulse provided in said output circuit when said oscillator ceases to oscillate, amplifying means connected to the output of the pulse-shaping means for amplifying the pulse provided thereby, current indicating means normally maintained unresponsive and means interconnecting the current indicating means and the amplifying means to cause energization of said indicating means upon the application of the amplified pulse appearing in the amplifying means.

3. In testing apparatus, an oscillator having a tunable input and a tunable output circuit, reactance probing means adapted to be moved into juxtaposition with a part to be tested which is electrically connected to one of the tunable oscillator circuits to change the load on the oscillator, means connected to the oscillator to cause it to scan repetitively over a predetermined frequency spectrum, said loading of said reactance probing means when placed in proximity to a part being tested, being of such value as to cause blocking of said oscillator at some frequency within the range, pulse-shaping means connected to the output of the oscillator to shape a pulse provided in said output circuit when said oscillator ceases to oscillate, amplifying means connected to the output of the pulse-shaping means for amplifying the pulse provided thereby, current indicating means normally maintained unresponsive, means interconnecting the current indicating means and the amplifying means to cause energization of said indicating means upon the application of the amplified pulse appearing in the amplifying means, and further pulse-producing means synchronized with the means causing repetitive scanning and connected to the control for the indicating means to cause the same to be deenergized at the completion of each scanning cycle so that the indicating means will be energized for a certain predetermined portion of the frequency range width depending on where in said range the oscillator blocks.

4. In testing apparatus, an oscillator having tunable input and a tunable output circuit, reactance probing means conductively connected to one of the tunable circuits to change the load on said oscillator when brought into juxtaposition with a part to be tested, modulating means connected to the oscillator to cause it to scan repetitively over a predetermined frequency spectrum which includes a frequency at which the oscillator may become overloaded and blocked when the probe is placed in juxtaposition to a part having certain characteristics, current indicating means and control means connected to the current indicating means for turning on and off the current applied to said current indicating means, said control means being connected to the modulator and to the oscillator and being controlled by the pulse produced by the cessation of oscillations to energize the indicating meter and by a pulse produced by the modulator to deenergize the same.

5. In testing apparatus, an oscillator having tunable input and a tunable output circuit, reactance probing means conductively connected to one of the tunable circuits to change the load on said oscillator when brought into juxtaposition with a part to be tested, modulating means connected to the oscillator to cause it to scan repetitively over a predetermined frequency spectrum which includes a frequency at which the oscillator may become overloaded and blocked when the probe is placed in juxtaposition to a part having certain characteristics, current indicating means, control means connected to the current indicating means for turning on and off the current applied to said current indicating means, said control means also being connected to the modulator and to the oscillator and being controlled by the pulse produced by the cessation of oscillations to energize the indicating meter and by a pulse produced by the modulator to deenergize the same, pulse-shaping and amplifying means connected between the oscillator output and the control means to apply to the latter a control pulse when the oscillator ceases to oscillate, said modulator also producing a control pulse once per cycle of scanning, which is applied to the control means.

6. In testing apparatus, an oscillator having a tunable input and a tunable output circuit, reactance probing means adapted to be moved into juxtaposition with a part to be tested which is electrically connected to one of the tunable oscillator circuits to change the load on the oscillator, means connected to the oscillator to cause it to scan repetitively over a predetremined frequency spectrum, said loading of the reactance probing means when placed in proximity to a part being tested being of such value as to cause blocking of said oscillator at some frequency within the range and providing an actuating pulse when said oscillator ceases to oscillate, indicating means connected to the output of the oscillator and energized by said pulse, and pulse actuated switching means connected to the indicating means and to the means connected to the oscillator to cause it to scan to cut off the indicating means at the end of each scanning cycle.

References Cited in the file of this patent

UNITED STATES PATENTS

| | | |
|---|---|---|
| 2,477,384 | Mann et al. | July 26, 1949 |
| 2,564,777 | Cavanagh | Aug. 21, 1951 |